US012770790B2

(12) United States Patent
Yamazaki et al.

(10) Patent No.: US 12,770,790 B2
(45) Date of Patent: Oct. 20, 2026

(54) DIELECTRIC RESIN FILM HAVING ONE OR MORE INSULATING PROTRUSIONS, AND FILM CAPACITOR

(71) Applicant: Murata Manufacturing Co., Ltd., Nagaokakyo (JP)

(72) Inventors: Kazuto Yamazaki, Nagaokakyo (JP); Tomomichi Ichikawa, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 133 days.

(21) Appl. No.: 18/917,068

(22) Filed: Oct. 16, 2024

(65) Prior Publication Data

US 2025/0037938 A1 Jan. 30, 2025

Related U.S. Application Data

(63) Continuation of application No. PCT/JP2023/015314, filed on Apr. 17, 2023.

(30) Foreign Application Priority Data

Apr. 21, 2022 (JP) ................................ 2022-070235

(51) Int. Cl.

*H01G 4/18* (2006.01)
*H01G 4/32* (2006.01)
*H01G 4/33* (2006.01)

(52) U.S. Cl.

CPC ................ *H01G 4/18* (2013.01); *H01G 4/32* (2013.01); *H01G 4/33* (2013.01)

(58) Field of Classification Search

None

See application file for complete search history.

(56) References Cited

U.S. PATENT DOCUMENTS

| | | | |
|---|---|---|---|
| 9,105,408 B2 | 8/2015 | Ichikawa et al. | |
| 2014/0368970 A1 | 12/2014 | Ichikawa et al. | |
| 2021/0366656 A1* | 11/2021 | Furuhashi | H01G 4/18 |
| 2022/0270823 A1* | 8/2022 | Inakura | C09D 175/04 |

(Continued)

FOREIGN PATENT DOCUMENTS

| | | |
|---|---|---|
| JP | H04-315410 A | 11/1992 |
| JP | H07-070418 B2 | 7/1995 |
| JP | 2006-269727 A | 10/2006 |

(Continued)

OTHER PUBLICATIONS

International Search Report received for PCT Patent Application No. PCT/JP2023/015314, mailed on Jun. 13, 2023, 2 pages (English Translation Only).

*Primary Examiner* — Eric W Thomas
(74) *Attorney, Agent, or Firm* — ArentFox Schiff LLP

(57) ABSTRACT

A dielectric resin film that includes: a dielectric resin film body that has two principal surfaces opposite to each other; and one or more insulating protrusions on at least one of the two principal surfaces, each of the one or more insulating protrusions having: a density of 1 piece/cm$^2$ to 10 pieces/cm$^2$, an average height of 2 μm or more, and an average area of 550 μm$^2$ or more as viewed from a normal direction of the at least one of the two principal surfaces.

18 Claims, 3 Drawing Sheets

(56) References Cited

U.S. PATENT DOCUMENTS

| | | | |
|---|---|---|---|
| 2023/0298822 | A1 | 9/2023 | Yamazaki et al. |

FOREIGN PATENT DOCUMENTS

| | | | |
|---|---|---|---|
| JP | 2014-107394 | A | 6/2014 |
| JP | 2015-088553 | A | 5/2015 |
| WO | 2013/128726 | A1 | 9/2013 |
| WO | 2022/075357 | A1 | 4/2022 |

* cited by examiner

DIELECTRIC RESIN FILM HAVING ONE OR MORE INSULATING PROTRUSIONS, AND FILM CAPACITOR

CROSS REFERENCE TO RELATED APPLICATIONS

The present application is a continuation of International application No. PCT/JP2023/015314, filed Apr. 17, 2023, which claims priority to Japanese Patent Application No. 2022-070235, filed Apr. 21, 2022, the entire contents of each of which are incorporated herein by reference.

TECHNICAL FIELD

The present disclosure relates to a dielectric resin film and a film capacitor.

BACKGROUND ART

Film capacitors are known to have a high self-recovery capability. It is proposed in Patent Document 1 that a large number of nanoparticles are dispersed on a surface of a dielectric film in order to further enhance this self-recovery capability.

Patent Document 1: JP-A-2014-107394

SUMMARY OF THE DISCLOSURE

However, in the method in Patent Document 1, a large number of dispersed nanoparticles serve as starting points of insulation breakdown, and the electrostatic capacitance of a film capacitor thus tends to decrease when a high voltage is applied.

An object of the present disclosure is to provide a dielectric resin film capable of forming a film capacitor with an excellent self-recovery capability, and electrostatic capacitance that hardly decreases when a high voltage is applied.

The present disclosure relates to a dielectric resin film including: a dielectric resin film body that has two principal surfaces opposite to each other; and one or more insulating protrusions on at least one of the two principal surfaces, each of the one or more insulating protrusions having: a density of 1 piece/cm$^2$ to 10 pieces/cm$^2$, an average height of 2 μm or more, and an average area of 550 μm$^2$ or more as viewed from a normal direction of the at least one of the two principal surfaces.

The resin film body may contain a cured product of a curable resin.

The cured product of the curable resin may have a urethane bond.

The resin film body may contain a reaction product of a first organic material having two or more hydroxyl groups in a first molecule and a second organic material having two or more isocyanate groups in a second molecule.

The first organic material may further have an aromatic ring.

The present disclosure also relates to a film capacitor including: two or more dielectrics opposite to each other; a first metal layer between the two or more dielectrics; and a second metal layer opposite to the first metal layer with a first of the two or more dielectrics between the first and second metal layers, in which at least one of the two or more dielectrics includes the above-described dielectric resin film.

According to the present disclosure, it is possible to provide the dielectric resin film capable of forming a film capacitor with an excellent self-recovery capability, and electrostatic capacitance that hardly decreases when a high voltage is applied.

DETAILED DESCRIPTION OF THE PREFERRED EMBODIMENTS

[Dielectric Resin Film]

Figure 1:
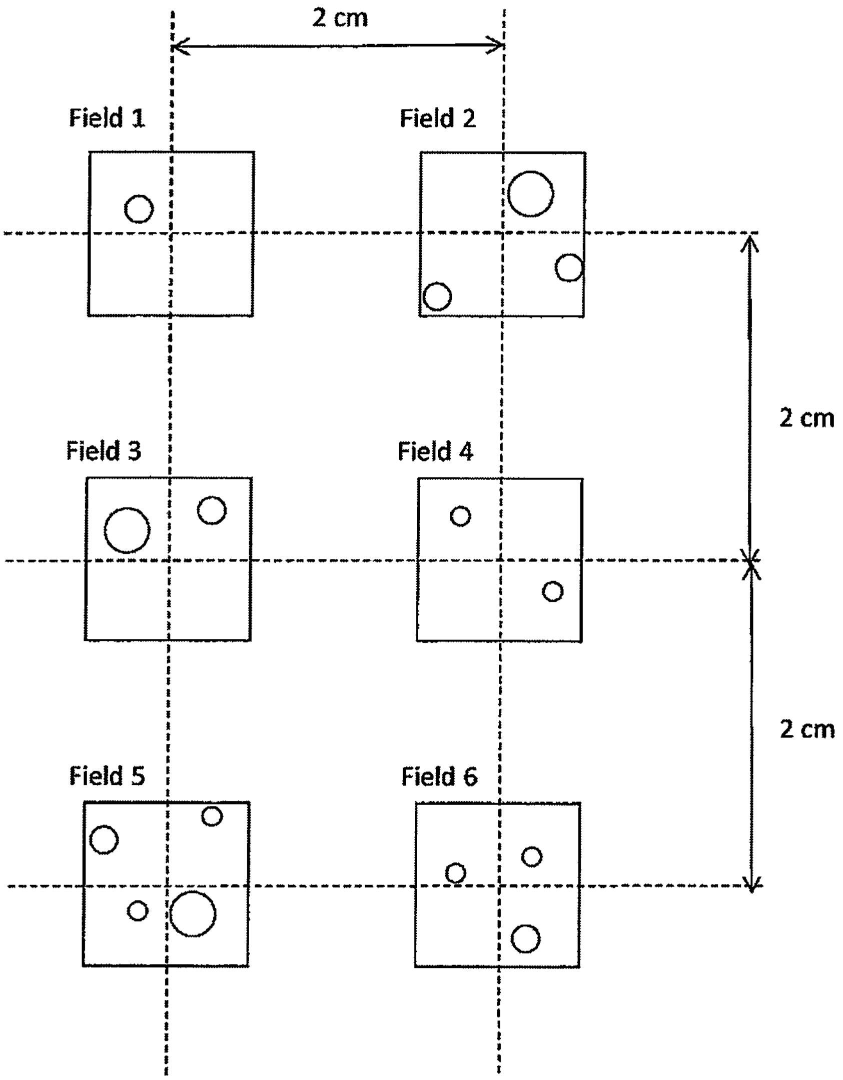
FIG. 1 is a diagram for explaining a method of calculating an average height of protrusions.

A film capacitor includes two or more dielectrics opposite to each other, a first metal layer sandwiched between the dielectrics, and a second metal layer opposite to the first metal layer with one of the dielectrics sandwiched therebetween. Typically, a dielectric resin film (hereinafter, may be simply referred to as a film) is used as the dielectric. The metal layer is usually formed on at least one principal surface of the film. The film capacitor can include a plurality of films (hereinafter, can be referred to as a metallized film) that is formed in a laminated state or is wound in an overlapped state, each film including this metal layer (the former can be referred to as a laminated film capacitor, and the latter can be referred to as a wound film capacitor).

The film capacitor has a so-called self-healing function. The self-healing function is a function of scattering, when a local insulation breakdown occurs in a film, a metal layer through a short-circuit current flowing at the breakdown point to ensure insulation. The film is also decomposed by the short-circuit current to generate gas. In a case in which there is a gap between the films opposite to each other (in this case, "adjacent to each other") with the metal layer sandwiched therebetween, the gas derived from the films is easily released to the outside of the capacitor, and the self-healing function is thus easily exhibited. On the other hand, since the area of the metal layer is reduced, the electrostatic capacitance of the film capacitor is greatly reduced in general.

In the present disclosure, bulky protrusions are arranged at low density on at least one principal surface of a dielectric resin film body while a sufficient gap between films are provided in order to reduce film defects. The average height of one or more bulky protrusions is 2 μm or more, and the average area is 550 μm$^2$ or more. The density of the protrusions is 1 piece/cm$^2$ to 10 pieces/cm$^2$. Therefore, both the high self-recovery capability and the minimization of a decrease in the electrostatic capacitance are achieved.

The self-recovery capability is determined by, for example, a failure mode when a high voltage is applied to the film capacitor for the purpose of evaluation to cause a failure of the film capacitor. In a case in which the failure occurs in an open mode, it can be determined that the film capacitor has a high self-recovery capability. In a case in which the failure occurs in a short mode, it can be determined that the film capacitor has an inferior self-recovery capability.

The film capacitor generally has a rated voltage of about 100 V to 2,000 V. From the viewpoint of reliability, it is demanded that the electrostatic capacitance hardly decreases even though a voltage of about 115% to 250% (at least about 115% to 130%) of the rated voltage is applied to the film capacitor. In the capacitor including the films according to the present disclosure, the electrostatic capacitance hardly decreases even when a high voltage is applied. For example, even though a voltage of 115% or more of the rated voltage is applied to the capacitor including the films according to the present disclosure, 50% of the initial electrostatic capacitance can be maintained. The fact that the electrostatic capacitance hardly decreases suggests that the degree of insulation breakdown is small. Even though the degree of insulation breakdown is small, the failure due to the short mode of the film capacitor hardly occurs.

(Protrusion)

A protrusion has an insulating property. One or more protrusions are disposed on at least one principal surface of the resin film body (hereinafter, may be simply referred to as a film body). The protrusions contribute to the formation of a gap between the films. The protrusions can also serve as a starting point for insulation breakdown.

The protrusions are specified by the following method. First, one surface of the film body is irradiated with probe light, and the luminance of the reflected light or transmitted light is measured. The luminance average value of the entire observation range is calculated to specify a region where luminance values equal to or less than half of the average luminance value continue in a constant area (for example, 0.5 $\mu m^2$ or more). The area of the region is designated to eliminate dust and other debris. This region is not coplanar with the other region of the observation range, and includes a portion protruding from the above-described surface of the film body, a portion recessed from the above-described surface of the film body, a crater-shaped portion where the periphery is raised and the central portion is recessed, and other portions. Among the specified regions, a region including portions protruding from the above-described surface of the film body is defined as protrusions. The protrusions also include a region including a partially recessed portion as in the above-described crater shape.

Whether or not the specified region includes protruding portions can be determined by, for example, a determination method with an image analysis technique from a captured image and luminance variation, a method of capturing the region obliquely upward, or other methods. The protrusions may be specified using a surface defect inspection apparatus (for example, OMI-UL28 manufactured by AYAHA ENGINEERING CO., LTD.).

The protrusions may be disposed on at least one principal surface of the film body. It is sufficient that the protrusions disposed on at least one principal surface satisfy the above-described size and density, and the protrusions may not be disposed on the other principal surface. In addition, protrusions that do not satisfy the above-described size and density may be disposed on the other principal surface. In particular, the protrusions are preferably disposed on one principal surface of the film body alone, from the viewpoint of easily controlling the self-recovery capability and easily minimizing a decrease in the electrostatic capacitance.

The density of the protrusions is 1 piece/$cm^2$ to 10 pieces/$cm^2$. In a case in which the density of the protrusions is less than 1 piece/$cm^2$, it is difficult to form a sufficient gap between the films. The density of the protrusions is preferably 2 pieces/$cm^2$ or more, and more preferably 3 pieces/$cm^2$ or more, from the viewpoint of more easily forming a gap between the films. In a case in which the density of the protrusions is more than 10 pieces/$cm^2$, the number of insulation breakdown points is excessively large, resulting in a great decrease in the electrostatic capacitance. From the viewpoint of the electrostatic capacitance, the density of the protrusions is preferably 8 pieces/$cm^2$ or less, and more preferably 6 pieces/$cm^2$ or less.

Since the average height of the protrusions is high, a sufficient gap can be provided between the films even though the density is low as described above. Furthermore, since the area of the protrusions is large, the protrusions are hardly crushed, and the gap between the films is maintained even though the film body is pressed in the thickness direction thereof. In a process of producing the capacitor, a plurality of the films can be wound in a laminated or overlapped state, and optionally pressed after lamination or winding. In this case, the film body can be pressed in the thickness direction thereof.

The density of the protrusions is obtained by counting all the protrusions specified by the irradiation of the probe light in the observation range and dividing the number of these protrusions by the area of the observation range. The observation range is 40 $cm^2$ to 50 $cm^2$.

The average height of the protrusions is 2 μm or more. In a case in which the average height of the protrusions is less than 2 μm, it is difficult to form a sufficient gap between the films at the above-described density. The average height of the protrusions is preferably 2.5 μm or more, and more preferably 3 μm or more, from the viewpoint of more easily forming a gap between the films. As the protrusions are higher, it is easier to form a sufficient gap between the films. From the viewpoint of miniaturization and ensuring of the electrostatic capacitance, the average height of the protrusions may be 20 μm or less, 15 μm or less, 8 μm or less, or 5 μm or less.

The size and density of the protrusions are also determined from a film (or metallized film) taken out by decomposition of the film capacitor.

A method of calculating the average height of the protrusions will be described with reference to FIG. 1.

First, six adjacent fields of view (Fields 1 to 6) are determined on a film. The size of one field of view is 1 $cm^2$. The six fields of view are arranged in two rows in the horizontal direction and three rows in the vertical direction. The distance between the centers of the fields of view aligned in the horizontal direction is 2 cm. The distance between the centers of the fields of view aligned in the vertical direction is 2 cm.

Thicknesses Hp of all the protrusions in the film observed in each field of view are measured using a laser microscope. Separately, any one point is selected from the portion other than the protrusions in each field of view, and the thickness of the film (that is, the thickness of the film body) at the portion other than the protrusions is measured in the same manner. The average value of the thicknesses of the film body at the six points is defined as an average thickness Ha of the film body. The average value of values (Hp−Ha) obtained by subtracting the average thickness Ha from the thicknesses Hp of the individual protrusions is the average height of the protrusions. In a case in which the protrusions are disposed on both principal surfaces of the film body, the average height of the protrusions is calculated for each principal surface.

No protrusion may be provided in one field of view. However, the fields of view are determined such that a total of 10 or more protrusions are observed in the six fields of view. When viewed from the normal direction of the film, a protrusion, the entirety of which is included in the field of view, is subjected to the measurement, and a protrusion, the partial portion of which is included in the field of view alone, is not subjected to the measurement.

The average area of the protrusions is 550 μm$^2$ or more. In a case in which the average area of the protrusions is less than 550 μm$^2$, it is difficult to maintain a gap between the films at the above-described density. The average area of the protrusions is preferably 580 μm$^2$ or more, more preferably 650 μm$^2$ or more, and particularly preferably 700 μm$^2$ or more, from the viewpoint of more easily maintaining a gap between the films. The average area of the protrusions may be 2,000 μm$^2$ or less, 1,500 μm$^2$ or less, or 1,000 μm$^2$ or less, from the viewpoint of further minimizing a decrease in the electrostatic capacitance.

The average area of the protrusions is calculated from the observation range of the same image used when the density of the protrusions is calculated. The area of all the protrusions specified as described above when viewed from the normal direction of the principal surface of the film body is measured, and the average value thereof is employed as the average area of the protrusions. In a case in which the protrusions are disposed on both principal surfaces of the film body, the average area of the protrusions is calculated for each principal surface.

In a case in which the average height of the protrusions is less than 2 μm, and the density of the protrusions is 1 piece/cm$^2$ to 10 pieces/cm$^2$, a sufficient gap cannot be formed between the films. Therefore, the self-recovery capability decreases. In a case in which the average height of the protrusions is less than 2 μm, the self-recovery capability can be improved when the density of the protrusions is more than 10 pieces/cm$^2$ (for example, about 25 pieces/cm$^2$). However, since the number of insulation breakdown points increases, the decrease in the electrostatic capacitance is likely to be large.

In a case in which the average area of the protrusions is less than 550 μm$^2$, the protrusions are crushed by the force pressing the film body in the thickness direction thereof, regardless of the density of the protrusions. Therefore, a gap between the films cannot be maintained. In a case in which the average area of the protrusions is less than 550 μm$^2$, the self-recovery capability can be improved when the density of the protrusions is more than 10 pieces/cm$^2$ (for example, about 25 pieces/cm$^2$). However, since the number of insulation breakdown points increases as described above, the decrease in the electrostatic capacitance is likely to be large.

A material of the protrusions is not limited as long as it has the insulating properties. Typical examples of a substance having the insulating properties (insulator) include organic materials such as resin and rubber and inorganic materials such as ceramics and glass.

A method of forming the protrusions is not limited. The protrusions may be formed by disposing insulating particles on the surface of the film body. In this case, the particles are desirably fixed to the surface of the film body from the viewpoint of density control. The protrusions may be formed by subjecting the film body to embossing finish. The protrusions may be formed by the formation of an organic material containing insulating particles into a film. Alternatively, the protrusions may be integrally formed from the same material as that of the film body. In particular, from the viewpoint of productivity, reduction of contamination, and other factors, the protrusions are preferably integrally formed of the same material as that of the film body.

The protrusions integrally formed from the same material as that of the film body are formed by, for example, a part of a curable organic material aggregating during the film formation or curing. In this case, various protrusions are irregularly formed on the surface of the film body. The aggregation of the organic material can be controlled by filming conditions, curing conditions, composition of the organic material, and other conditions. The protrusions are easily formed by, for example, increasing the proportion of a curing agent (a second organic material described later), increasing the proportion of a curing agent as a multimer, or other ways.

A shape of the protrusions is not limited. The shape of the protrusions when viewed from the normal direction of the principal surface of the film body is, for example, a circle (including an ellipse), a rectangle, another polygon, or an indefinite shape. The shape of the protrusions when viewed from the thickness direction of the film body can also be, for example, a circle (including an ellipse), a rectangle, another polygon, or an indefinite shape.

(Organic Material)

The film body is dielectric. The film body contains, for example, a cured product of an organic material. In the film body, a content of the cured product can be, for example, 90% by mass or more, furthermore 95% by mass or more, or particularly 98% by mass or more, and the upper limit can be 100% by mass. The content of the cured product described above can be measured based on the mass change before and after the film body (or film) is immersed in a solvent such as toluene for 24 hours or more.

The film body may contain a cured product of a curable resin. The curable resin may be thermosetting or photocurable. A thermosetting resin means a resin that can be cured by heat. A curing method for obtaining a cured product of the thermosetting resin is not limited. A method of curing the thermosetting resin may be heating or a method other than heating (for example, irradiation with active energy rays, addition of a polymerization initiator, reaction with a curing agent, and self-polymerization). A photocurable resin means a resin that can be cured by active energy rays. A curing method for obtaining a cured product of the photocurable resin is also not limited. A method of curing the photocurable resin may be irradiation with active energy rays or a method other than the irradiation with active energy rays (for example, heating, addition of a polymerization initiator, reaction with a curing agent, and self-polymerization). Examples of the active energy rays include light rays such as far ultraviolet rays, ultraviolet rays, near ultraviolet rays, and infrared rays; electromagnetic waves such as X-rays and γ-rays; electron beams; proton beams; neutron beams. The cured product of the curable resin is obtained by curing the thermosetting resin or the photocurable resin with heating, irradiation with active energy rays, or other methods.

The film body may contain the cured product of the curable resin as a principal component. Accordingly, heat resistance can be improved. The principal component is a component that accounts for 50% by mass or more of the film body.

Examples of the curable resin include a phenol resin, an epoxy resin, a melamine resin, a urea resin, an unsaturated polyester resin, a silicone resin, a phenoxy resin, and a curable polyimide.

The cured product of the curable resin may contain at least one of a urethane bond or a urea bond. The presence of a urethane bond or a urea bond can be confirmed using a Fourier transform infrared spectrophotometer (FT-IR). The cured product of the curable resin may contain a urethane bond.

The film body can contain a reaction product of a first organic material (base agent) having two or more hydroxyl groups in one molecule and a second organic material (curing agent) having two or more isocyanate groups in one molecule. This reaction product has a urethane bond. The hydroxyl groups of the first organic material and the isocyanate groups of the second organic material react with each other to form a urethane bond that is a crosslinked structure, thereby obtaining a cured product.

<First Organic Material>

The first organic material has two or more hydroxyl groups in one molecule. The hydroxyl equivalent of the first organic material can be, for example, 150 g/eq or more, furthermore 200 g/eq or more, or particularly 220 g/eq or more, and can be, for example, 400 g/eq or less, furthermore 350 g/eq or less, or particularly 300 q/eq or less.

The first organic material may be a compound further having an epoxy group. The number of epoxy groups in one molecule is 1 to 4, typically 2 to 3, and particularly 2. The epoxy group in the first organic material is typically bonded to an end of the main chain.

The first organic material may be linear or branched, and is typically linear.

Examples of the first organic material include polyvinyl acetal such as polyvinylacetoacetal; polyhydroxy polyether such as a phenoxy resin; polyester polyols. In particular, the first organic material may have an aromatic ring and may be a polyhydroxy polyether. The first organic material is used alone or in combination of two or more kinds thereof.

The phenoxy resin can be, for example, a reactant of a bisphenol compound such as bisphenol A, bisphenol B, bisphenol C, bisphenol E, bisphenol F, or bisphenol G, and epichlorohydrin.

The weight-average molecular weight of the first organic material is not limited. The weight-average molecular weight of the first organic material may be, for example, less than 75,000, may be 70,000 or less, or may be 40,000 or less. The weight-average molecular weight of the first organic material may be, for example, 2,000 or more, or may be 5,000 or more. In one embodiment, the weight-average molecular weight of the first organic material is 2,000 or more and less than 75,000.

In the present specification, the weight-average molecular weight can be measured by gel permeation chromatography (GPC), and can be specified as a conversion value using polystyrene as a standard sample.

<Second Organic Material>

The second organic material has two or more isocyanate groups in one molecule. The isocyanate equivalent of the second organic material can be, for example, 50 g/eq or more, furthermore 70 g/eq or more, or particularly 100 g/eq or more, and can be, for example, 200 g/eq or less, furthermore 160 g/eq or less, or particularly 140 q/eq or less.

Examples of the second organic material include a monomer of a compound having an isocyanate group and a multimer thereof. Examples of the monomer include aromatic polyisocyanates such as 4,4'-diphenylmethane diisocyanate, tolylene diisocyanate, and xylylene diisocyanate; aliphatic polyisocyanates such as hexamethylene diisocyanate; alicyclic polyisocyanates such as dicyclohexylmethane diisocyanate and isophorone diisocyanate; and modified products of the above-described aromatic polyisocyanate, aliphatic polyisocyanate, and alicyclic polyisocyanate. Examples of the multimer include dimers, trimers, and higher multimers of the aromatic polyisocyanate, aliphatic polyisocyanate, and alicyclic polyisocyanate. Specific examples of the multimer include dimers such as uretdione; trimers such as adducts, isocyanurates, and biurets; polymeric polyisocyanates, and other multimers. The second organic material is used alone or in combination of two or more kinds thereof.

In a case in which the proportion of the second organic material as a multimer is increased, a protrusion satisfying the above-described size is easily formed. From this viewpoint, the fractional occupancy of the second organic material as a multimer on a molar basis is preferably 20% by mol or more, more preferably 25% by mol or more, and particularly preferably 30% by mol or more of the total second organic material. From the same viewpoint, the fractional occupancy of the second organic material as a multimer on a molar basis is preferably 70% by mol or less, more preferably 60% by mol or less, and particularly preferably 50% by mol or less of the total second organic material. In one aspect, the fractional occupancy of the second organic material as a multimer on a molar basis is 20% by mol to 70% by mol of the total second organic material.

In the formation of the protrusions, in a case in which the proportion of the second organic material as a multimer does not need to be considered, the fractional occupancy of a multimer on a molar basis may be 5% by mol or more, or may be 10% by mol or more. Similarly, the fractional occupancy of a multimer on a molar basis with respect to the total second organic material may be 70% by mol or less, 60% by mol or less, or 50% by mol or less. In one aspect, the fractional occupancy of the second organic material as a multimer on a molar basis is 5% by mol to 70% by mol of the total second organic material.

The mass ratio of the first organic material and the second organic material is not limited. In a case in which the proportion of the second organic material is increased, a protrusion satisfying the above-described size is easily formed. In this regard, the mass fraction of the second organic material with respect to the total of the first organic material and the second organic material is preferably 15% by mass or more, more preferably 20% by mass or more, and particularly preferably 25% by mass or more. The mass fraction of the second organic material with respect to the above-described total is preferably 50% by mass or less, more preferably 45% by mass or less, and particularly preferably 40% by mass or less, from the viewpoint that the density of the protrusions is easily controlled within the above-described range. In one embodiment, the mass fraction of the second organic material with respect to the above-described total is 15% by mass to 50% by mass.

In the formation of the protrusions, in a case in which the proportion of the second organic material does not need to be considered, the mass fraction of the second organic material with respect to the above-described total may be 10% by mass or more, 20% by mass or more, or 30% by mass or more. Similarly, the mass fraction of the second organic material with respect to the above-described total may be 80% by mass or less, 70% by mass or less, or 60% by mass or less. In one embodiment, the mass fraction of the second organic material with respect to the above-described total is 10% by mass to 60% by mass.

The molar ratio of isocyanate groups contained in the second organic material to hydroxyl groups contained in the first organic material (NCO/OH) can be, for example, 0.9 or more, furthermore 1 or more, or particularly 1.1 or more, and can be, for example, 2 or less, furthermore 1.5 or less, or particularly 1.3 or less.

(Others)

The film body may contain other additives. Examples of an additive include a leveling agent, and other additives. The additive may or may not be physically or chemically bonded to the cured product of the first organic material and the second organic material. In a case in which the additive has a hydroxyl group, an epoxy group, a silanol group, a carboxy group, or other functional groups, the additive can be chemically bonded (covalently bonded) to the cured product of the first organic material and the second organic material.

The film body may contain unreacted substances of the first organic material and/or the second organic material. In this case, the film body has either or both of a hydroxyl group and an isocyanate group. The presence of a hydroxyl group or an isocyanate group in the film body can be confirmed using a Fourier transform infrared spectrophotometer (FT-IR).

The average thickness Ha of the film body is not limited. The average thickness Ha of the film body may be 5 μm or less, 3.5 μm or less, or 3.4 μm or less. The average thickness Ha of the film body may be 0.5 μm or more. The average thickness Ha of the film body is an average thickness of the film at a portion other than the protrusions, which is calculated as described above.

[Method of Producing Dielectric Resin Film]

Hereinafter, a method of producing a film provided with protrusions integrally formed from the same material as that of the film body will be described. The method of producing a film according to the present disclosure, however, is not limited thereto.

The dielectric resin film is produced by, for example, a method including: (1) a step of preparing a resin solution by mixing the first organic material, the second organic material, and a solvent; (2) a step of coating a base material with the resin solution to form a coating film; (3) a step of drying the coating film and removing the solvent to form a dry coating film; and (4) a step of heating and curing the dry coating film.

(1) Step of Preparing Resin Solution

In this step, the first organic material, the second organic material, and the solvent are mixed.

The solvent is not limited as long as it can dissolve the first organic material and the second organic material. Examples of the solvent include ketone solvents such as methyl ethyl ketone and diethyl ketone; and ether solvents such as tetrahydrofuran and tetrahydropyran. The solvent is used alone or in combination of two or more kinds thereof.

In particular, a mixture of a ketone solvent and an ether solvent is preferable. The proportion of the ketone solvent in the mixture can be, for example, 10% by mass or more, furthermore 30% by mass or more, or particularly 40% by mass or more, and can be, for example, 90% by mass or less, furthermore 70% by mass or less, or particularly 60% by mass or less.

The total concentration of the first organic material and the second organic material in the resin solution can be, for example, 15% by mass to 25% by mass. In a case in which the mass fraction of the second organic material is 15% by mass to 50% by mass of the total of the first organic material and the second organic material, protrusions satisfying the above-described size and density are easily formed. In a case in which the mole fraction of the second organic material as a multimer is 5% by mol to 70% by mol of the total second organic material, protrusions satisfying the above-described size and density are easily formed.

The resin solution may contain a catalyst. Thus, the reaction rate between the first organic material and the second organic material can be increased. Examples of the catalyst include amine compounds such as triethylamine, tributylamine, and triethylenediamine; organometallic compounds such as titanium tetrabutoxide, dibutyltin oxide, dibutyltin dilaurate, zinc naphthenate, cobalt naphthenate, tin octylate, and dibutyltin dilaurate; inorganic compounds such as iron chloride and zinc chloride, and other catalysts.

The prepared resin solution may be subjected to a high-pressure homogenization treatment, a mechanical homogenization treatment, or an ultrasonic homogenization treatment. Thus, the dispersibility of each organic material is further enhanced.

(2) Coating Step

In the present step, the base material is coated with the prepared resin solution. For example, the coating with the resin solution is carried out so that the average thickness Ha of the film body after curing is 0.5 μm to 5 μm.

Typical examples of the base material include a resin base material. Examples of a resin constituting the resin base material include polyester resins such as polyethylene terephthalate.

Examples of a coating method include roll coating methods such as a reverse roll coating method, a gravure coating method, a roll coating method, a die coating method, and a bar coating method; a curtain coating method; a spray coating method; and a dip coating method.

(3) Drying Step

In the present step, the coating film is dried. The drying is typically carried out by heating.

The drying temperature can be, for example, 40° C. or higher, furthermore 50° C. or higher, or particularly 60° C. or higher, and can be, for example, 150° C. or lower, furthermore 130° C. or lower, or particularly 120° C. or lower.

(4) Curing Step

In the present step, the coating film is heated at a temperature equal to or higher than the drying temperature. The heating accelerates the reaction between the first organic material and the second organic material to obtain a cured film.

The temperature for curing the coating film (curing temperature) can be, for example, 100° C. or higher, furthermore 120° C. or higher, or particularly 140° C. or higher, and can be, for example, 170° C. or lower, furthermore 165° C. or lower, or particularly 160° C. or lower.

[Film Capacitor]

A film capacitor includes two or more dielectrics opposite to each other, a first metal layer sandwiched between the dielectrics, and a second metal layer opposite to the first metal layer with one of the dielectrics sandwiched therebetween. The two adjacent dielectrics are disposed opposite to each other with a metal layer sandwiched therebetween. In the film capacitor, metal layers and dielectrics are usually arranged alternately. Typically, a film is used as the dielectric.

At least one dielectric includes the dielectric resin film according to the present disclosure. The dielectrics may have the same or different configurations. It is preferable that all the dielectrics are the dielectric resin film according to the present disclosure from the viewpoint of a self-recovery capability and the minimization of a decrease in the electrostatic capacitance.

(Metal Layer)

A first metal layer and a second metal layer (hereinafter, may be collectively referred to as a metal layer) function as internal electrodes. The metal layer contains, for example, at least one selected from the group consisting of aluminum, titanium, zinc, magnesium, tin, and nickel, and can typically contain aluminum. Each metal layer may have the same or different configurations.

The thickness of each metal layer is, for example, 5 nm to 40 nm. The thickness of the metal layer can be measured by cutting a metallized film in the thickness direction and observing the cut surface with an electron microscope such as a field emission scanning electron microscope (FE-SEM).

The metal layer can be formed on at least one principal surface of the film by, for example, vapor deposition or sputtering. Alternatively, the metal layer may be a metal foil. The metal foil is laminated on the film, and the metal foil and the film are pressed and wound to be brought into close contact with each other. In particular, in a case in which the metal layer is formed by vapor deposition, a thin metal layer that has been in close contact with the film can be obtained, and an excellent self-recovery capability is easily obtained.

The metal layer is typically formed on at least one principal surface of the film. For example, the first metal layer is formed on one principal surface of a film. The second metal layer is formed on one principal surface of another film. In this case, a film (first metallized film) provided with the first metal layer and a film (second metallized film) provided with the second metal layer are disposed such that any one film is sandwiched between the first metal layer and the second metal layer.

The metal layer formed on the dielectric resin film according to the present disclosure may be provided on the principal surface on which the protrusions are disposed, or may be provided on the other principal surface. Typically, the metal layer is provided on the principal surface of the film on which the protrusions are disposed.

In the film capacitor, the first metallized film and the second metallized film can be a wound type in which the first metallized film and the second metallized film are wound in an overlapped state, and can be a laminated type in which the first metallized film and the second metallized film are laminated in the thickness direction. The film capacitor may further include a winding axis used for winding. Hereinafter, a wound body and a laminated body including a dielectric (typically, a dielectric resin film) and a metal layer may be collectively referred to as a capacitor element.

The cross-sectional shape of the capacitor element can be a circular shape, an elliptical shape, or an oval shape, and can be typically an elliptical shape or an oval shape from the viewpoint of small and low profile. The capacitor element having a circular cross-sectional shape can be pressed to form a capacitor element having an elliptical or oval cross-sectional shape.

The configuration of the capacitor element is not limited to a configuration with the first metallized film and the second metallized film provided, and the capacitor element may have any suitable configuration as long as it is provided with two or more dielectrics opposite to each other, a first metal layer sandwiched between the dielectrics, and a second metal layer opposite to the first metal layer with one of the dielectrics sandwiched therebetween.

(External Terminal Electrode)

The film capacitor further includes external terminal electrodes. The external terminal electrodes are usually disposed on two opposite end surfaces of the capacitor element, respectively. For example, in a wound film capacitor, the external terminal electrodes are disposed at two locations to cover both end surfaces of the capacitor element in the winding axis direction. One of the external terminal electrodes (first external terminal electrode) is electrically connected to the first metal layer. The other one of the external terminal electrodes (second external terminal electrode) is electrically connected to the second metal layer. The external terminal electrodes may have the same or different configurations.

The external terminal electrodes are typically formed by metal spraying. Examples of the types of metals include zinc, aluminum, tin, and a zinc-aluminum alloy. The thickness of each external terminal electrode is not limited. The thickness of each external terminal electrode is, for example, 0.5 μmm to 3 μmm.

Hereinafter, the film capacitor according to the present disclosure will be described in detail with reference to the drawings. However, the shape, arrangement, and other details of the film capacitor and each component of the following embodiments are not limited to the illustrated examples.

Figure 2:
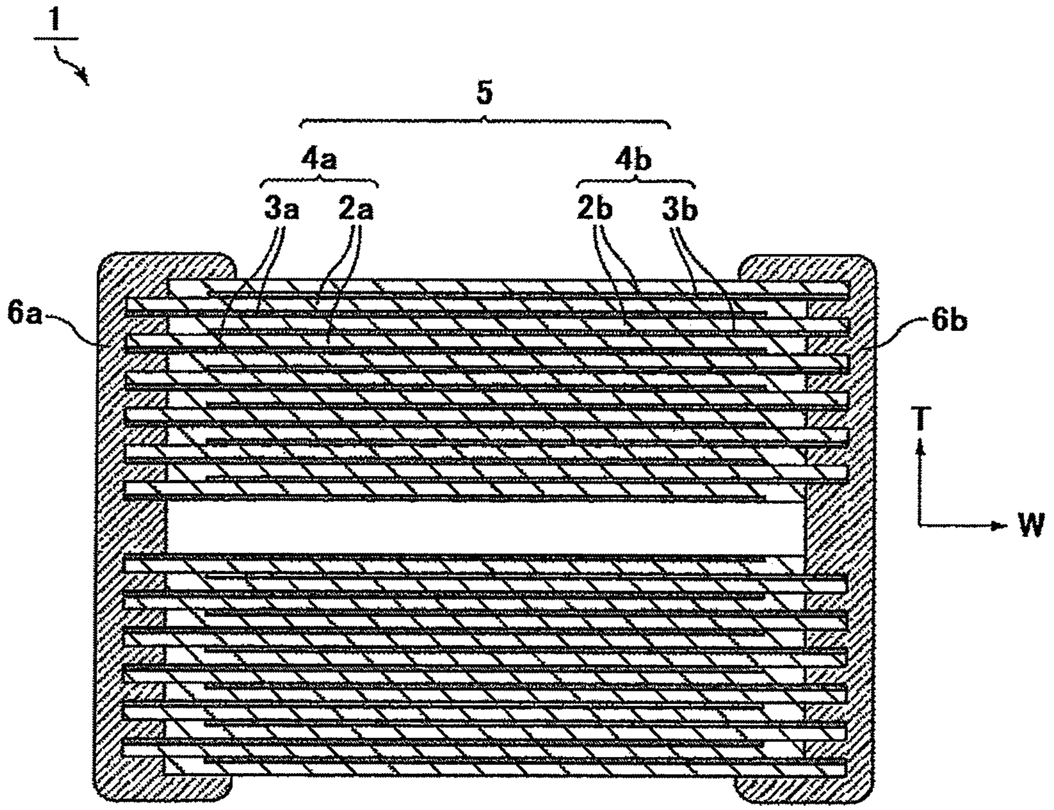
FIG. 2 is a longitudinal cross-sectional view showing an example of a film capacitor of the present disclosure.

FIG. 2 shows a wound film capacitor 1. The film capacitor 1 includes a capacitor element 5, a first external terminal electrode 6*a*, and a second external terminal electrode 6*b*. The capacitor element 5 is configured by winding a first metallized film 4*a* and a second metallized film 4*b* in a state in which the first metallized film 4*a* and the second metallized film 4*b* are overlapped with each other. The first external terminal electrode 6*a* and the second external terminal electrode 6*b* are formed at both end portions in a width direction (winding axis direction) W of the capacitor element 5, respectively, and are electrically connected thereto (more specifically, as will be described later, the first metal layer 3*a* and the second metal layer 3*b*, respectively).

The first metallized film 4*a* includes a first film 2*a* and a first metal layer 3*a* provided on one surface of the first film 2*a*. The second metallized film 4*b* includes a second film 2*b* and a second metal layer 3*b* provided on one surface of the second film 2*b*. At least one of the first film 2*a* or the second film 2*b* is a film according to the present disclosure.

The first film 2*a* and the second film 2*b* are disposed opposite to each other. The first metal layer 3*a* and the second metal layer 3*b* are disposed opposite to each other with the first film 2*a* or the second film 2*b* sandwiched therebetween. The first metal layer 3*a* is electrically connected to the first external terminal electrode 6*a*. The second metal layer 3*b* is electrically connected to the second external terminal electrode 6*b*.

The first metal layer 3*a* is formed on one surface of the first film 2*a* to reach one side edge of the first film 2*a* but not to reach the other side edge. Typically, the first metal layer 3*a* is formed to reach the side edge where the first metal layer 3*a* is electrically connected to the first external terminal electrode 6*a*, but not to reach the opposite side edge. The second metal layer 3*b* is formed on one surface of the second film 2*b* not to reach one side edge of the second film 2*b* but to reach the other side edge. Typically, the second metal layer 3*b* is formed to reach the side edge where the second metal layer 3*b* is electrically connected to the second external terminal electrode 6*b*, but not to reach the opposite side edge.

In the capacitor element 5, the first metallized film 4*a* and the second metallized film 4*b* are shifted from each other in the width direction W. Typically, the first metallized film 4*a* is disposed such that an end portion where the first metal layer 3*a* reaches a side edge of the first film 2*a* is exposed from the second metallized film 4*b*, and the second metallized film 4*b* is disposed such that an end portion where the second metal layer 3*b* reaches a side edge of the second film 2*b* is exposed from the first metallized film 4*a*. The first metallized film 4*a* and the second metallized film 4*b* are overlapped in such a shifted manner and wound, thereby forming the capacitor element 5. In the capacitor element 5, the first metal layer 3*a* and the second metal layer 3*b* are exposed at the end portions thereof.

In FIG. 2, the second metallized film 4*b* is overlapped to be positioned outside the first metallized film 4*a* in a radial direction T, and wound. In addition, the first metallized film

4*a* is disposed such that the principal surface on which the first metal layer 3*a* is provided faces the inside in the radial direction T, and the second metallized film 4*b* is disposed such that the principal surface on which the second metal layer 3*b* is provided faces the inside in the radial direction T.

The first external terminal electrode 6*a* is in contact with the exposed end portion of the first metal layer 3*a*, so that the first external terminal electrode 6*a* and the first metal layer 3*a* are electrically connected. Typically, the first metal layer 3*a* is in contact with the first external terminal electrode 6*a* in a state of protruding in the width direction W with respect to the first external terminal electrode 6*a*. The second external terminal electrode 6*b* is in contact with the exposed end portion of the second metal layer 3*b*, so that the second external terminal electrode 6*b* and the second metal layer 3*b* are electrically connected. Typically, the second metal layer 3*b* is in contact with the second external terminal electrode 6*b* in a state of protruding in the width direction W with respect to the second external terminal electrode 6*b*.

[Method of Producing Film Capacitor]

Hereinafter, a method of producing a wound film capacitor including metallized films will be described. The method of producing a film capacitor according to the present disclosure, however, is not limited thereto.

The wound film capacitor is produced by, for example, a method including a step of forming a metal layer on one principal surface of a dielectric resin film to obtain a metallized film; a step of overlapping and winding two or more metallized films to obtain a capacitor element; and a step of forming external terminal electrodes at both end portions in a winding axis direction of the capacitor element, respectively. At least one dielectric resin film constituting the metallized film is the film according to the present disclosure.

The metal layer is formed by vapor deposition, for example. The metal layer is, typically, provided on the principal surface of the film on which protrusions are disposed. The external terminal electrodes are formed by metal spraying, for example.

EXAMPLES

The present disclosure will be described more specifically with reference to the following examples, but the present disclosure is not limited thereto.

Example 1

(i) Production of Dielectric Resin Film

In a reaction vessel, 56 parts by mass of polyhydroxy polyether (phenoxy resin (bisphenol A type epoxy resin) which is a reactant of bisphenol A and epichlorohydrin, weight-average molecular weight: 50,000, hydroxyl equivalent: 284 g/eq, contains epoxy groups) as a first organic material and 30 parts by mass of 4,4'-diphenylmethane diisocyanate (MDI, mixture of monomer and multimer) as a second organic material were charged, and mixed with 400 parts by mass of a mixed solvent obtained by mixing methyl ethyl ketone (MEK) and tetrahydrofuran (THF) at a mass ratio of 1:1, to obtain a resin solution.

The obtained resin solution was applied onto a polyethylene terephthalate (PET) base material using a gravure coater such that the thickness after curing was 3.5 km. Subsequently, the coated base material was heated to 100° C. or higher in a drying furnace and sufficiently dried until the solvent became 0.5% or less to obtain a dry coating film. The obtained dry coating film was cured by heat treatment at 150° C. for about 4 hours to obtain a dielectric resin film. A plurality of protrusions were formed on a principal surface opposite to the base material of the dielectric resin film.

(ii) Production of Film Capacitor

A fluorine-based oil was applied to the principal surface of the dielectric resin film on which the protrusions were formed in order to form an electrode pattern. Aluminum was vapor-deposited on the principal surface of this film by a vacuum vapor deposition apparatus to produce a metallized film having an electrode pattern. The obtained metallized film was cut to a predetermined width and length. Subsequently, the two cut metallized films were overlapped with each other and then wound to obtain a capacitor element. External terminal electrodes were formed on both end portions of the capacitor element in the winding axis direction by metal spraying to obtain a film capacitor (rated voltage: 850 V).

Examples 2 to 3, Comparative Examples 1 to 3

Dielectric resin films and film capacitors were produced in the same manner as in Example 1, except that the mass fraction of the second organic material with respect to the total of the first organic material and the second organic material and/or the mole fraction of the multimer in the second organic material were changed as shown in Table 1.

Example 4

A dielectric resin film and a film capacitor were produced in the same manner as in Example 1, except that polyvinyl acetoacetal (weight-average molecular weight: 120,000) was used as the first organic material, and tolylene diisocyanate (TDI, mixture of monomer and multimer) was used as the second organic material, and the mass fraction of the second organic material to the total of the first organic material and the second organic material and the mole fraction of the multimer in the second organic material were changed as shown in Table 1.

Example 5

A film capacitor was produced in the same manner as in Example 1, except that a dielectric resin film was produced as follows.

(i) Production of Dielectric Resin Film

A mixed resin solution was prepared by adding 0.1% by weight of imidazole as a catalyst for a thermal curing reaction to a mixed resin obtained by mixing a phenoxy resin and an epoxy resin (novolak-type epoxy resin) at a mixing ratio of phenoxy resin/epoxy resin=80% by mass/20% by mass. In a reaction vessel, 100 parts by mass of the resulting mixed resin solution and 400 parts by mass of a mixed solvent obtained by mixing methyl ethyl ketone (MEK) and toluene at a mass ratio of 1:1 were mixed to obtain a resin solution.

The obtained resin solution was applied onto a PET base material using a gravure coater such that the thickness after curing was 3.5 μm. Subsequently, the coated base material was heated to 100° C. or higher in a drying furnace and sufficiently dried until the solvent became 0.5% or less to obtain a dry coating film. The obtained dry coating film was cured by heat treatment at 150° C. for about 4 hours to obtain a dielectric resin film. A plurality of protrusions were formed on a principal surface opposite to the base material of the dielectric resin film.

Evaluation

The obtained dielectric resin film and the film capacitor were evaluated as follows. The evaluation results are shown in Table 1.

(1) Calculation of Density of Protrusions and Measurement of Area

The principal surface of the film opposite to the base material was captured from a normal direction thereof by a line sensor camera (OMI-UL28, manufactured by AYAHA ENGINEERING CO., LTD., resolution: 2.8 μm), and image processing was carried out to specify protrusions present within the observation range of an area of 45 μmm×95 μmm. The number of specified protrusions was counted, and divided by the area (45 μmm×95 μmm) of the observation range to calculate the density of the protrusions.

Figure 3:
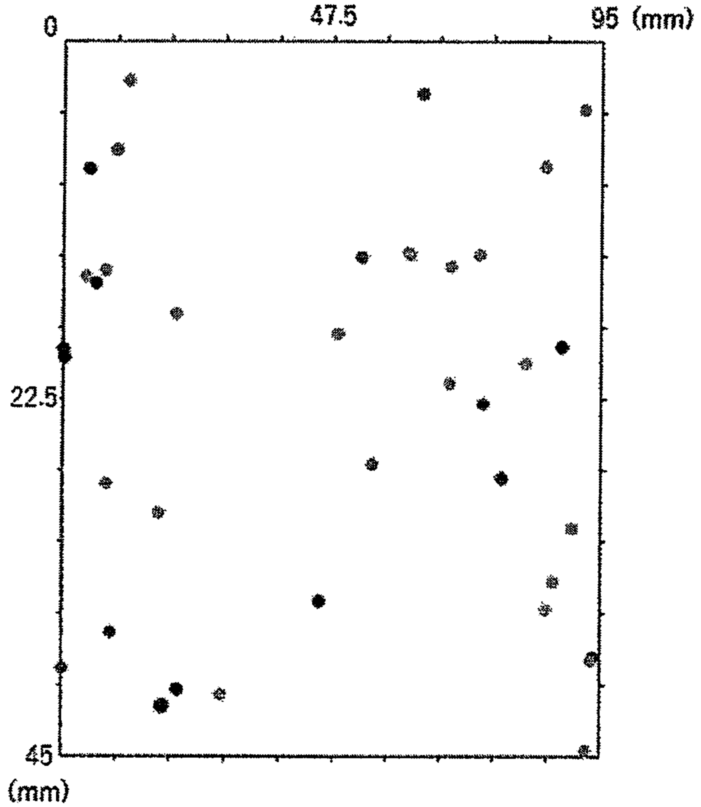
FIG. 3 is an image after a dielectric resin film prepared in Example 1 is captured by a line sensor camera and subjected to image processing.

Furthermore, areas of all the specified protrusions were measured. The average value of the areas was employed as the average area of the protrusions. FIG. 3 is an image after the film in Example 1 is captured by the line sensor camera and subjected to the image processing. The dots are protrusions. There were 43 protrusions confirmed from this image.

(2) Measurement of Height of Protrusion

From the film (area of 45 μmm×95 μmm), six fields of view were determined according to FIG. 1. Thicknesses Hp of all the protrusions in the film observed in each field of view were measured using a laser microscope (VK-8700, manufactured by KEYENCE CORPORATION). Separately, any one point was selected from the portion other than the protrusions in each field of view, and the thickness of the film (that is, the thickness of the film body) at the portion other than the protrusions was measured in the same manner. The average value of the thicknesses of the film body at the six points was defined as an average thickness Ha of the film body. The average value of values (Hp−Ha) obtained by subtracting the average thickness Ha from the thicknesses Hp of the individual protrusions was the average height of the protrusions.

(3) Measurement of Withstand Voltage (Evaluation of Minimization of Decrease in Electrostatic Capacitance)

The electrostatic capacitance when a voltage of 700 V was applied to the film capacitor in an atmosphere of 125° C. was defined as an initial value $C_0$. The electrostatic capacitance of the film capacitor was measured while the voltage applied at an electric field intensity of 50 V/μm was gradually increased every 1 hour from 700 V. The applied voltage when the electrostatic capacitance reached 50% of the initial value $C_0$ was defined as a withstand voltage. A film capacitor having a withstand voltage of 1000 V or more was evaluated as good, a film capacitor having a withstand voltage of 950 V or more and less than 1000 V was evaluated as fair, and a film capacitor having a withstand voltage of less than 950 V was evaluated as poor. It can be said that the larger the withstand voltage, the more the decrease in the electrostatic capacitance is minimized.

(4) Self-Recovery Capability

In the above-described withstand voltage evaluation, the voltage was gradually increased until the film capacitor failed, and the failure mode was confirmed. A film capacitor whose electrostatic capacitance was zero due to an open mode failure was evaluated as good, and a film capacitor that failed due to a short mode failure was evaluated as poor.

TABLE 1

| | Conditions of film production | | Protrusion | | | | |
|---|---|---|---|---|---|---|---|
| | Proportion of second organic material (% by mass) | Fractional occupancy of multimer in second organic material (% by mol) | Average height (μm) | Average area (μm²) | Density (pieces/cm²) | Self-recovery capability | Withstand voltage |
| Comparative Example 1 | 40 | 50 | 3.8 | 323 | 9.85 | Poor | Fair |
| Comparative Example 2 | 30 | 20 | 0.8 | 743 | 2.83 | Poor | Good |
| Comparative Example 3 | 20 | 50 | 3.8 | 683 | 0.58 | Poor | Good |
| Comparative Example 4 | 40 | 10 | 3.8 | 623 | 17.50 | Good | Poor |
| Example 1 | 35 | 30 | 3.9 | 599 | 7.93 | Good | Good |
| Example 2 | 30 | 30 | 3.1 | 812 | 1.01 | Good | Good |
| Example 3 | 35 | 40 | 2.0 | 713 | 1.68 | Good | Good |
| Example 4 | 30 | 50 | 2.1 | 643 | 3.21 | Good | Good |
| Example 5 | — | — | 2.2 | 598 | 2.12 | Good | Good |

In the films produced in Examples 1 to 3, the protrusions having a density of 1 piece/cm² to 10 pieces/cm², an average height of 2 μm or more, and an average area of 550 μm² or more are formed. Therefore, the obtained film capacitors exhibited an excellent self-recovery capability and a high withstand voltage.

The films produced in Examples 4 and 5 were different from the films in Examples 1 to 3 in the materials of the main body and the protrusions, but the obtained film capacitors exhibited the same self-recovery capability and withstand voltage as those of Examples 1 to 3. From this, it can be seen that, regardless of the materials of the main body and the protrusions, an excellent self-recovery capability and a high withstand voltage can be obtained in the case where the density of the protrusions is 1 piece/cm² to 10 pieces/cm², the average height is 2 μm or more, and the average area is 550 μm² or more.

In contrast, the protrusions of the film produced in Comparative Example 1 have a density of 1 piece/cm² to 10 pieces/cm², and an average height of 2 μm or more, but have an average area of less than 550 μm². Therefore, the obtained film capacitor is inferior in the self-recovery capability. This is considered to be because the protrusions were crushed when the capacitor was produced, and a sufficient gap thus could not be secured between the films.

The protrusions of the film produced in Comparative Example 2 have a density of 1 piece/cm² to 10 pieces/cm², and an average area of 550 μm² or more, but have an average height of less than 2 μm. Therefore, a sufficient gap cannot be secured between the films, and the obtained film capacitor is inferior in the self-recovery capability.

The protrusions of the film produced in Comparative Example 3 have an average height of 2 μm or more, and an average length of 30 μm or more, but have a density of less than 1 piece/cm$^2$. Therefore, a sufficient gap cannot be secured between the films, and the self-recovery capability is inferior. The protrusions of the film produced in Comparative Example 4 have an average height of 2 μm or more, and an average area of 550 μm$^2$ or more, but have a density of more than 10 pieces/cm$^2$. Therefore, the number of insulation breakdown points increases, and the obtained film capacitor is inferior in the withstand voltage.

The dielectric resin film of the present disclosure is used for the film capacitor. Since this film capacitor has the excellent self-recovery capability, and the electrostatic capacitance hardly decreases when a high voltage is applied, the film capacitor can be applied to various electronic devices.

REFERENCE SIGNS LIST

1 Film capacitor
**2*a*** First film
**2*b*** Second film
**3*a*** First metal layer
**3*b*** Second metal layer
**4*a*** First metallized film
**4*b*** Second metallized film
5 Capacitor element
**6*a*** First external terminal electrode
**6*b*** Second external terminal electrode
W Width direction
T Radial direction

The invention claimed is:

1. A dielectric resin film comprising:
a dielectric resin film body that has two principal surfaces opposite to each other; and
one or more insulating protrusions on at least one of the two principal surfaces, each of the one or more insulating protrusions having:
a density of 1 piece/cm$^2$ to 10 pieces/cm$^2$,
an average height of 2 μm or more, and
an average area of 550 μm$^2$ or more as viewed from a normal direction of the at least one of the two principal surfaces.

2. The dielectric resin film according to claim 1, wherein the density is 2 pieces/cm$^2$ to 8 pieces/cm$^2$.

3. The dielectric resin film according to claim 1, wherein the density is 3 pieces/cm$^2$ to 6 pieces/cm$^2$.

4. The dielectric resin film according to claim 1, wherein the average height is 2 μm to 20 μm.

5. The dielectric resin film according to claim 1, wherein the average area is 550 μm$^2$ to 2,000 μm$^2$.

6. The dielectric resin film according to claim 1, wherein the resin film body comprises a cured product of a curable resin.

7. The dielectric resin film according to claim 6, wherein the cured product of the curable resin has a urethane bond.

8. The dielectric resin film according to claim 1, wherein the resin film body comprises a reaction product of a first organic material having two or more hydroxyl groups in a first molecule and a second organic material having two or more isocyanate groups in a second molecule.

9. The dielectric resin film according to claim 8, wherein the first organic material further has an aromatic ring.

10. A film capacitor comprising:
two or more dielectrics opposite to each other;
a first metal layer between the two or more dielectrics; and
a second metal layer opposite to the first metal layer with a first of the two or more dielectrics between the first and second metal layers, wherein
at least one of the two or more dielectrics includes the dielectric resin film according to claim 1.

11. The film capacitor according to claim 10, wherein the density is 2 pieces/cm$^2$ to 8 pieces/cm$^2$.

12. The film capacitor according to claim 10, wherein the density is 3 pieces/cm$^2$ to 6 pieces/cm$^2$.

13. The film capacitor according to claim 10, wherein the average height is 2 μm to m.

14. The film capacitor according to claim 10, wherein the average area is 550 μm$^2$ to 2,000 μm$^2$.

15. The film capacitor according to claim 10, wherein the resin film body of the dielectric resin film comprises a cured product of a curable resin.

16. The film capacitor according to claim 15, wherein the cured product of the curable resin has a urethane bond.

17. The film capacitor according to claim 10, wherein the resin film body of the dielectric resin film comprises a reaction product of a first organic material having two or more hydroxyl groups in a first molecule and a second organic material having two or more isocyanate groups in a second molecule.

18. The film capacitor according to claim 17, wherein the first organic material further has an aromatic ring.

* * * * *